Patented Apr. 18, 1939

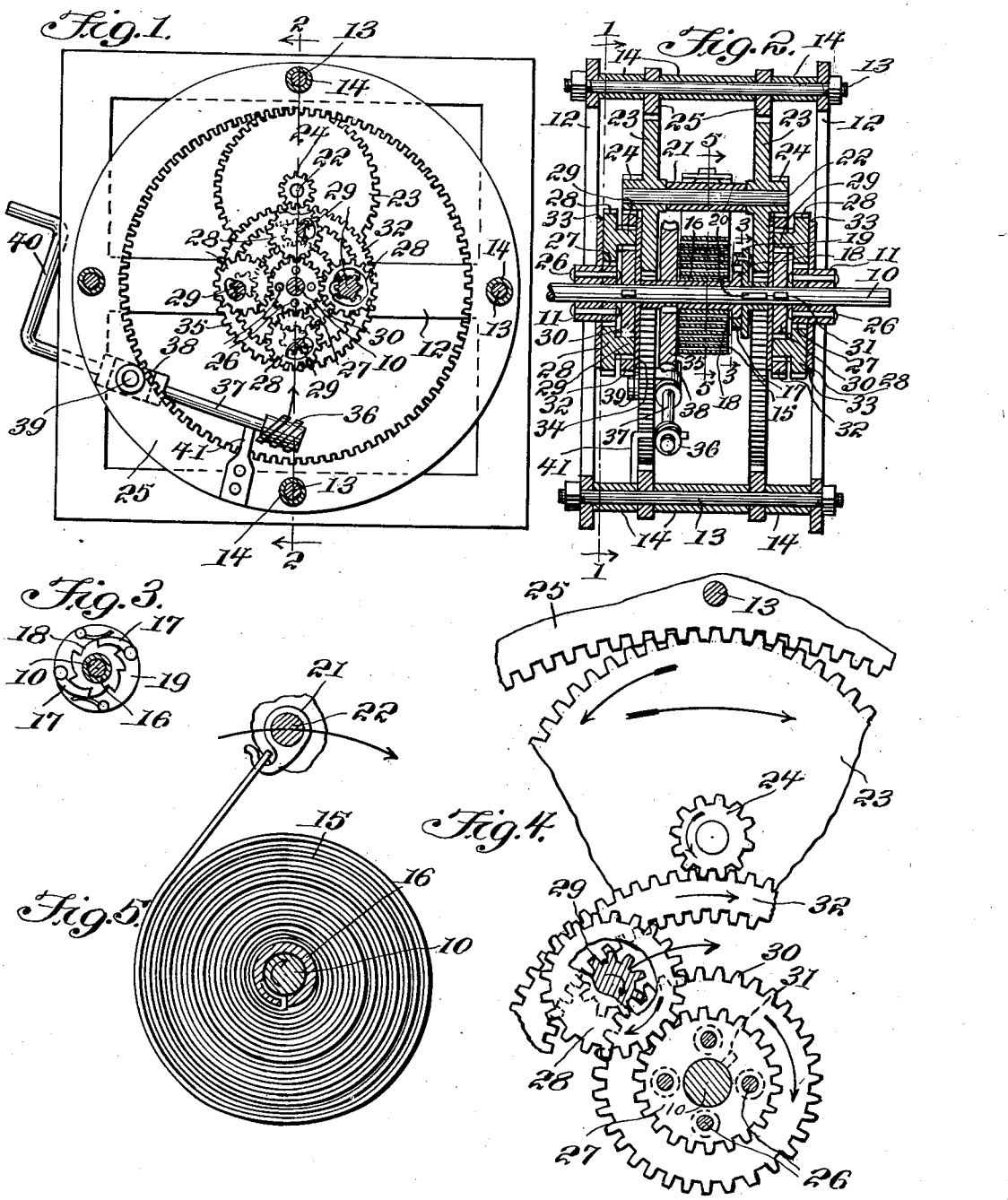

2,154,699

UNITED STATES PATENT OFFICE 2,154,699

SPRING MOTOR

James W. Richardson, Dayton, Ohio

Application January 6, 1937, Serial No. 119,322

1 Claim. (Cl. 74—305)

The object of the invention is to provide a spring motor comprising an arrangement of parts whereby a powerful spring may be employed and its energy dissipated over a comparatively great interval of time, so that the motor is adapted for operation through a long period without rewinding; to provide an arrangement that makes for the most effective winding of the spring after having been unwound; and generally to provide a spring motor which is of comparatively simple form, susceptible of cheap manufacture and adapted for a multiplicity of uses.

With this object in view, the invention consists in a construction and combination of parts of which a preferred embodiment is illustrated in the accompanying drawing, wherein:

Figure 1 is a sectional view on the plane indicated by the line 1—1 of Figure 2.

Figure 2 is a sectional view on the plane indicated by the line 2—2 of Figure 1.

Figure 3 is a sectional view on the plane indicated by the line 3—3 of Figure 2.

Figure 4 is an enlarged elevational view, partly broken away of the gear train comprising the motor.

Figure 5 is a sectional view on the plane indicated by the line 5—5 of Figure 2.

The power take-off shaft 10 is journaled in bearings 11 at opposite sides of a framework comprising the frames 12 which are united by means of bolts 13 and intervening spacers 14.

The shaft 10 is rotated by means of the spring 15 but the latter is not directly connected to the shaft, the inner end of the spring being anchored to a sleeve 16 mounted loosely on the shaft so as to turn freely with respect to the latter in one direction. Movement of the sleeve in the opposite direction, however, effects movement of the shaft in that direction by reason of the pawls 17 engaging a rotary wheel 18 formed as an element of the sleeve, the pawls being mounted on a disk 19 keyed to the shaft 10 as indicated at 20. This arrangement provides for winding the spring without imparting a reverse movement to the shaft.

The remote end of the spring 15 is hooked to a sleeve 21, the latter being loosely mounted on a shaft 22 between planet gears 23 for which it acts as a spacer, the gears being preferably frictionally secured to the shaft in common with the pinions 24.

The planet gears 23 mesh with ring gears 25 supported in the frame between the end frames, being retained in position by the bolts 13 and the spacers 14, the latter being interposed between the ring gears and between them and the end frames. By reason of this construction, any rotation of the planet gears on their own axes is attended with a bodily movement in an arc having its center in the axis of the power take-off shaft 10.

Connected rigidly to the frame by means of rivets or fasteners 26, are pinions 27, these pinions being in mesh with small planet gears 28 having formed integral therewith the planet pinions 29. The pinions 29 mesh with gears 30 keyed at 31 to the shaft 10. These pinions also mesh with ring gears 32 which are toothed both on their inner and outer peripheries, the outer peripheral teeth meshing with the pinions 24 while the inner teeth are in mesh with the pinions 29.

The gear pinion pairs 28—29 are thus floatingly mounted and aside from axial rotation, rotate in an orbit, spacer disks 33 being interposed between them and the end cases 12 and spacer disks 34 being interposed between them and the planet gears 23. These latter disks also serve as spacers between the gears 30 and the planet gears 23.

It is obvious that when the spring is wound, the tendency will be to impart a rotary or turning movement to the shaft 10 in a right hand direction as the structure is viewed in Figure 1. But the shaft rotating right handedly will also rotate the gear 30 right handedly and the pinions 29 as well as the gears 28 left handedly on their own axes. But the gears 28 mesh with the fixed gears 27 which results in orbital right hand rotation. Therefore the gear pinion pairs 28—29, rotating in an orbit right handedly cause rotation right handedly of the ring gear 32. Such rotation of the ring gear 32 results in axial rotation left handedly of the pinions 24 and the planet gears 23 but since these latter mesh with the ring gears 25, they and their pinions 24 rotate bodily in a right handed direction and thus tend to wind up the spring by reason of carrying the looped end in the same direction in which the shaft 10 is turned. But since the angular velocity of the orbital movement of the gears 23 is much less than the angular velocity of the shaft 10, there can be an unwinding of the spring but the construction provides for this unwinding operation taking place over a long period of time.

In order that the spring may be wound up when it has run down, the sleeve 16 to which the inner end of the spring 15 is anchored carries a worm gear 35 keyed or otherwise secured to it. This worm gear is arranged to be engaged with a worm 36 carried at the extremity of a winding shaft 37, the latter being rotated in a bearing 38, pivotally mounted, as indicated at 39, on one of the ring gears 25. The outer end of the shaft 37 is provided with a crank 40 by which rotary movement may be imparted to it. The pivotal or snugly mounted bearing 38 makes possible the elevation of the worm to mesh with the worm gear, after which rotation of the shaft 37 will effect turning of the worm gear and the winding of the spring without rotation of the shaft 10 due to the ratchet-pawl connection 17—18.

When the motor is in operation, the worm is disengaged from the worm gear, the shaft 37 resting on a bracket support 41.

The invention having been described, what is claimed as new and useful is:

Gearing comprising a power take-off shaft, an orbital means having its orbital center coincident with the axis of the shaft, and means for imparting movement to the orbital means in the direction of rotation of the shaft but at less angular speed than that of the shaft, the orbital means comprising a relatively fixed gear and pinion, and the movement imparting means comprising a fixed gear having its axis coincident with the axis of the power shaft, a gear fixed to the power shaft, a relatively fixed orbital gear and pinion of which the former is in mesh with the fixed gear and the latter in mesh with the power shaft carried gear, an externally and internally toothed annular gear of which the internal teeth are in mesh with the last said pinion and the external teeth in mesh with the first said orbital pinion and a fixed internally toothed annular gear in mesh with the teeth of the first said orbital gear.

JAMES W. RICHARDSON.